Feb. 16, 1960   L. P. GIESELER   2,924,967
STRAIN GAGE OUTPUT CIRCUIT
Filed Nov. 29, 1955   2 Sheets-Sheet 1
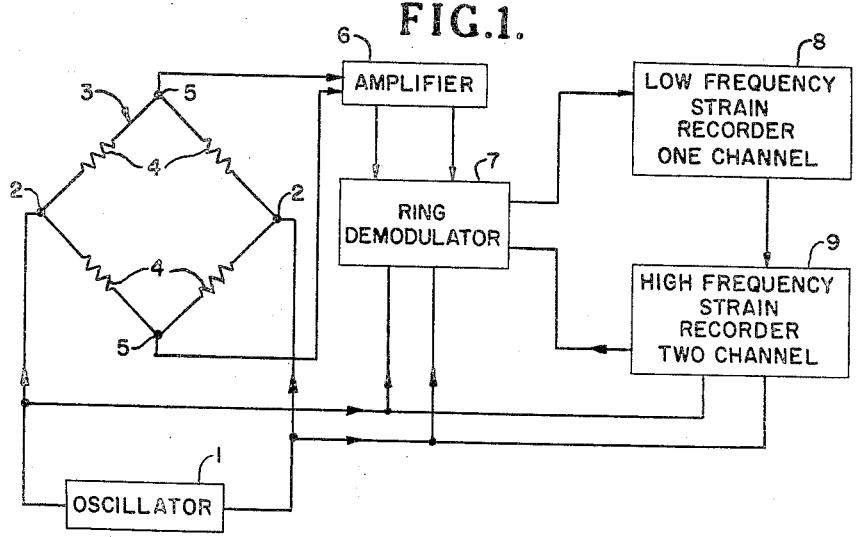
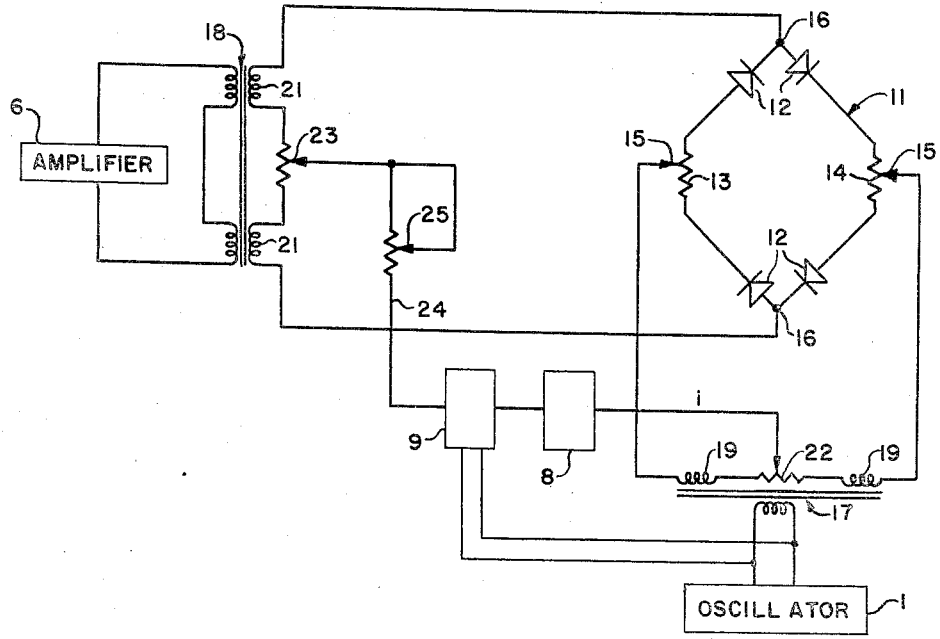
INVENTOR
L. P. GIESELER
BY
ATTORNEYS

INVENTOR
L. P. GIESELER

United States Patent Office 2,924,967
Patented Feb. 16, 1960

2,924,967

STRAIN GAGE OUTPUT CIRCUIT

Luther P. Gieseler, Rockville, Md.

Application November 29, 1955, Serial No. 549,893

6 Claims. (Cl. 73—88.5)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in electronic instruments used for measuring and recording, or indicating strains in materials and structures, and more particularly to carrier type of instruments for the measurement and recording of the high- and low-frequency components of strain in a structural member when subjected to an impact load.

Although electronic instrumentation methods for measuring and recording the two components of strain are well-known in the art none of these have proven to be entirely satisfactory. In one method a D.-C. current is applied across a Wheatstone strain gage bridge coupled to a recording device through a D.-C. amplifier having a high-frequency response. Another method utilizes a carrier strain gage bridge system with an applied A.-C. frequency higher than any transient strains likely to be encountered. The first method has the disadvantage of drift and the generation of spurious thermal voltages in the D.-C. amplifier. The second method requires the balancing of the strain gages at the high-frequency utilized which due to phase shifting is difficult to accomplish.

An object of the present invention is to provide an electronic instrument for measuring and recording both the high- and low-frequency components of strain.

Another object of the present invention is to provide an improved and simplified carrier type electronic system for the measurement of strain.

Still another object of the instant invention is the provision of electronic instrumentation for concurrently recording the high and low frequency components of strain.

A further object of the present invention is to provide an improved ring demodulator circuit.

Other objects of the invention will become apparent from the following description taken in connection with the accompanying drawings, forming a part of this specification, and in which:

Figure 1 is a block diagrammatic view showing the electrical relationship of the several units of the subject measuring system;

Figure 3 is a diagrammatic view of the "ring," or rectifier, demodulator circuit which is a preferred unit of the subject invention.

Figure 2A:
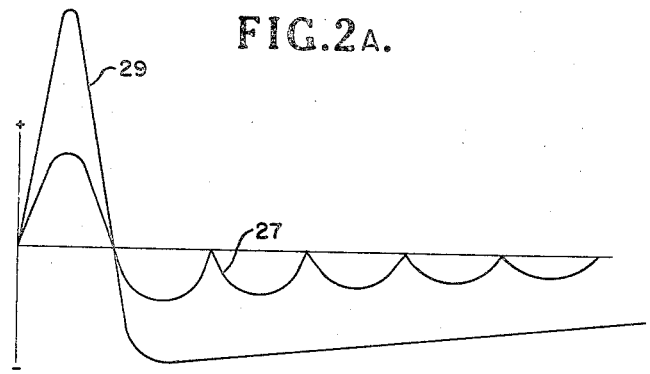
Figures 2A and 2B are graphs of the wave forms of the output of the ring demodulator, and of the carrier voltage.

Referring more particularly to the drawings wherein like numerals indicate like parts throughout the several views and more particularly to Fig. 1 whereon is shown, in block diagram form, the several units comprising the essential elements of the instrument of the present invention. A carrier frequency voltage of, for example, 400 c.p.s. of a conventional sinusoidal oscillator 1 is fed to the input terminals 2 of a conventional Wheatstone strain gage bridge circuit 3 initially in a balanced condition and having no output voltage. Upon unbalance of the bridge circuit by a variation in the resistance of any of the resistance strain gage elements 4 in the legs of the bridge due to a strain in the structure to which the gage is secured, an unbalance signal voltage is produced at the bridge output terminals 5, which voltage is either in phase, or 180 degrees out of phase with the carrier voltage supplied to the bridge, the phase being dependent on whether the unbalanced bridge condition resulted from a strain in tension or compression. The signal voltage is fed to a voltage amplifier 6 the bandwidth of which is sufficiently broad to pass the carrier frequency, and all higher frequencies associated with the transient strains anticipated to be encountered. The wide band amplifier 6 amplifies the signal voltage and the signal voltage is then fed to the ring demodulator circuit 7. Of course, it is to be understood that amplifier 6 may be omitted if the elements 4 are of sufficient sensitivity or if the carrier voltage of oscillator 1 is of sufficient magnitude to produce a voltage to actuate demodulator 7. The carrier frequency output of oscillator 1 is also fed to the ring demodulator 7 wherefrom a pulsating direct current output is obtained having the fast and slow changes in strain contained therein. The output voltage of the demodulator is fed to two serially connected conventional oscillographic recorders 8 and 9. Recorder 8 is a conventional low frequency responsive signal channel recorder whose low frequency responsive characteristic is due to a large inertial recording element which, by reason of its large mass, is capable of following only relatively slow variations in the demodulated signal current applied to it. Recorder 9 is a conventional high frequency responsive dual channel recorder whose high frequency (substantially higher than the oscillator frequency) responsive characteristic is due to a small inertial recording element capable of following relatively rapid variations in the signal current applied to it. By feeding the demodulator output signal to one channel of recorder 9 and the carrier frequency voltage of the oscillator 1 to the other channel, the high frequency, or transient, variation of strain can be determined.

Figure 2B:
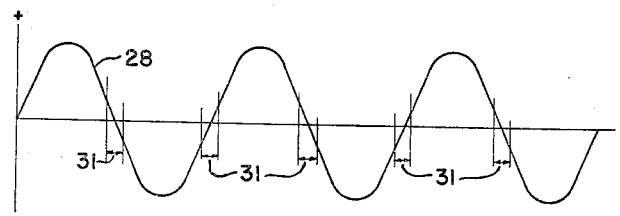

For example, the curve indicated by reference numeral 27 on Fig. 2A illustrates a typical transient signal trace while reference numeral 28 on Fig. 2B illustrates the carrier output signal of oscillator 1, both signals being recorded by the two channel high frequency recorder 9. To determine the instantaneous or high frequency strain, use is made of the equation:

$$\text{Strain} = \frac{d}{K|A|}$$

wherein; K is a calibration constant determined by application of predetermined static loads to the structure to which the strain gage is secured, $d$ is the amplitude of the signal trace 27 at a particular instant, and $|A|$ is the amplitude of the carrier signal 28 at the same instant, considered as a positive quantity. The resultant calculated value of high frequency strain for several instants, or number of points, on curves 27 and 28 is indicated by the curve 29. An analysis of the equation and curve 28 indicates that in the intervals where the curve crosses the abscissa, indicated by the numeral 31, a value of infinity for the strain is calculated, although actually the strain is of a finite value at that interval. To overcome this inaccuracy existing for a minor portion of the cycle, interpolation between two known values of strain on each side of the interval, or "dead zone" 31 may be resorted to. In addition a square wave may be employed in place of the sine wave oscillator 1 to reduce the "dead zone." This would also simplify the above equation since in this case |A| would always be a constant quantity.

Although the above described instrument operates satisfactorily using conventional units well-known in the art of strain measurement, optimum operation of the instrument is obtainable when the ring demodulator as shown on Fig. 3 is utilized. As shown on Fig. 3, the preferred ring demodulator comprises a bridge circuit, generally indicated by the numeral 11, having rectifier elements 12, preferably of a crystal or copper oxide variety, joined in series-aiding relationship and resistance elements 13 and 14, such as a potentiometer connected together in a closed loop. The bridge circuit 11 serves as the rectifier element in the ring demodulator. Connected to diagonally opposite input terminals 15 and 16 of the bridge circuit 11 are input transformers 17 and 18, each transformer having a pair of balanced secondary windings 19 and 21. The signal voltage output of amplifier 6 is fed to the demodulator through input transformer 18 and the carrier voltage from oscillator 1 is fed to the demodulator through input transformer 17. The secondary windings of both input transformers are connected in series aiding relationship through a potentiometer resistance element 22 and 23. Bridged between the center terminals of the potentiometers 22 and 23 is the output circuit 24 in which flows the load current $i$. Series connected in the load circuit 24 are load current $i$ adjusting variable resistance 25 and recording or indicating devices 8 and 9.

The potentiometers 13 and 14 employed in the bridge circuit 11 facilitates the zeroing of the recording or indicating devices 8 and 9 when no signal voltage is applied to the modulator. Potentiometers 22 and 23 serve to remove any A.C. component present in the load circuit 24 when no signal voltage is applied to the demodulator, and to equalize the amplitudes of alternate cycles of the load current $i$ when a signal voltage is applied to the demodulator. More specifically the optimum adjustment of the balancing potentiometer controls 13, 14, 22 and 23 tend to improve the operation of the ring demodulator by compensating for any undesirable operational effects resulting from unbalanced input transformer secondary windings and imperfect matching of rectifier elements.

The output load current $i$ of the ring demodulator is a pulsating direct current, the amplitude and polarity of which is substantially proportional to the magnitude and sense of unbalance of the Wheatstone strain gage bridge circuit.

Although the Wheatstone bridge 3 has been described and illustrated as having a strain gage 4 in each leg thereof, it is apparent, of course, that satisfactory operation of the bridge would result if a strain gage were disposed in only one leg of the bridge and resistors were disposed in the remaining three legs. Furthermore recorder 9 may be a two-channel cathode ray oscilloscope equipped with a camera to photograph the oscilloscope traces.

Figure 4:
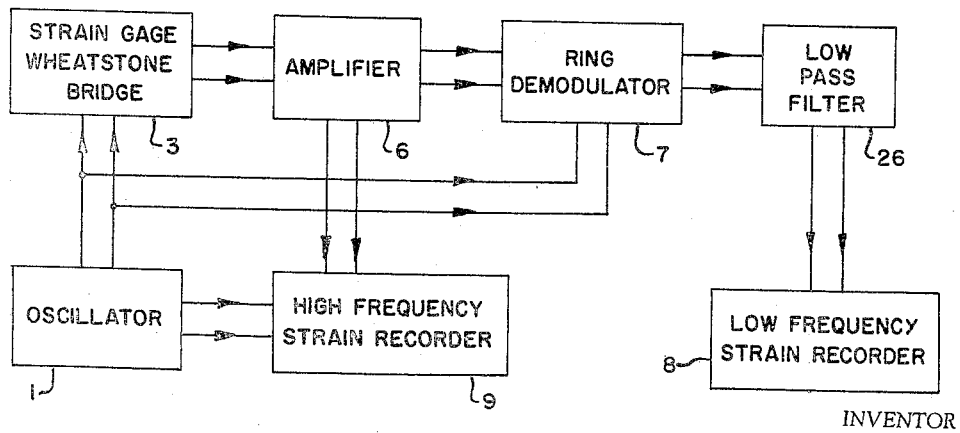
Figure 4 is a block diagrammatic view showing an alternative arrangement of the several units of the subject measuring system.

Fig. 4 shows an alternate combination for measuring the low and high frequency components of strain whereon the high frequency responsive recorder 9 is connected to the output of the wide band amplifier 6 instead of being connected in the ring demodulator load circuit. The low frequency responsive recorder 8 is retained in the ring demodulator circuit. However since the high frequency components of strain are no longer required in this load circuit, a low pass filter network 26 is placed in series with the recorder to filter out the high frequency components of strain.

Various changes may be made in the form of the invention herein shown and described without departing from the spirit of the invention or the scope of the following claims.

What is claimed as new and desired to be secured by Letters Patent of the United States is:

1. In a measuring system, the combination of a Wheatstone bridge having input and output terminals and including at least one variable impedance strain element, a carrier frequency source connected to said input terminals, a wide band amplifier connected to said output terminals, a ring demodulator connected to said amplifier and to said carrier source, and first and second electroresponsive recorder devices serially coupled to said demodulator, for concurrently and individually recording the divers frequency components of the output signal of said demodulator, said first recorder device having a slow responsive recording element and said second recorder device having a fast responsive recording element.

2. In a measuring system, the combination of a Wheatstone strain gage bridge, a carrier frequency source connected to a first pair of terminals of said bridge, a wide band amplifier connected to a second pair of terminals of said bridge, a ring demodulator connected to said amplifier and to said carrier source, a single channel graphic recorder having a large inertial recording element, and a dual channel graphic recorder having small inertial recording elements, said single channel recorder and a first of said dual channels being serially connected to said demodulator, the second of said dual channels being connected to said carrier source for effecting evaluation of the magnitude of the recording made by the inertial recording element of the first of said dual channels.

3. A ring demodulator having a bridge circuit comprising four rectifiers joined in series aiding relationship and a pair of potentiometers discretely interposed in said bridge circuit, a source of carrier energy connected between the center terminals of said potentiometers, a source of modulated carrier energy connected across said bridge circuit diagonally from said carrier energy source, and a load circuit bridged between said energy sources.

4. A ring demodulator comprising four rectifiers connected together in a closed bridge each with its best conductivity in the same direction around the bridge, a pair of resistance elements interposed in one pair of diagonally opposed vertices of said bridge, each of said resistance elements being engaged by a slidable contact, a first input transformer having a pair of coupled balanced secondary windings connected to each of said contacts and adapted to develop a voltage across said one pair of diagonally opposed vertices of the bridge, a second input transformer having a pair of coupled balanced secondary windings connected across the other pair of diagonally opposed vertices of the bridge, a source of carrier frequency applied to said first input transformer, a source of modulated frequency applied to said second input transformer, potentiometer resistance elements interposed between said coupled secondary windings, and a load circuit bridged between the center terminals of said potentiometer elements.

5. A ring demodulator comprising a bridge circuit having four rectifiers joined in series aiding relationship in a closed loop, a pair of potentiometers interposed in one pair of diagonally opposed vertices of said bridge, a pair of input circuits individually connected between said potentiometers and the other pair of diagonally opposed vertices of said bridge, respectively, a carrier current source connected to the first input circuit, an intelligence modulated frequency source connected to the second input circuit, said modulated frequency source being of the same frequency as said carrier source, and an output circuit connected between said input circuits for utilizing selected characteristics of both sources.

6. In a strain measuring system, the combination of a normally balanced Wheatstone strain gage bridge which is adapted to be unbalanced upon application of a strain thereto, unbalance of said bridge being effective to develop therefrom an output signal having high and low frequency components correlative to the magnitude and sense of the strain applied thereto, a carrier frequency source connected to a first pair of terminals of said bridge, a ring demodulator coupled to a second pair of terminals of said bridge and to said source for developing an output signal correlative to said developed high and low frequency components, and a plurality of means serially coupled to said ring demodulator for concurrently and separately recording the high and low frequency components of said demodulator output signal.

References Cited in the file of this patent

UNITED STATES PATENTS

| | | |
|---|---|---|
| 2,422,806 | Silverman | June 24, 1947 |
| 2,438,948 | Riesz | Apr. 6, 1948 |
| 2,469,383 | Gibbs et al. | May 10, 1949 |
| 2,625,036 | Cowles | Jan. 13, 1953 |

FOREIGN PATENTS

| | | |
|---|---|---|
| 630,083 | Great Britain | Oct. 5, 1949 |

OTHER REFERENCES

Tech. Pub. "A Four Channel Dynamic Strain-Recorder," in Journal of Scientific Instruments, vol. 29, August 1952, pages 253–256.